April 16, 1929. L. G. RATTERMAN 1,709,486
COVER FOR REFRIGERATING CABINETS
Filed Nov. 25, 1927
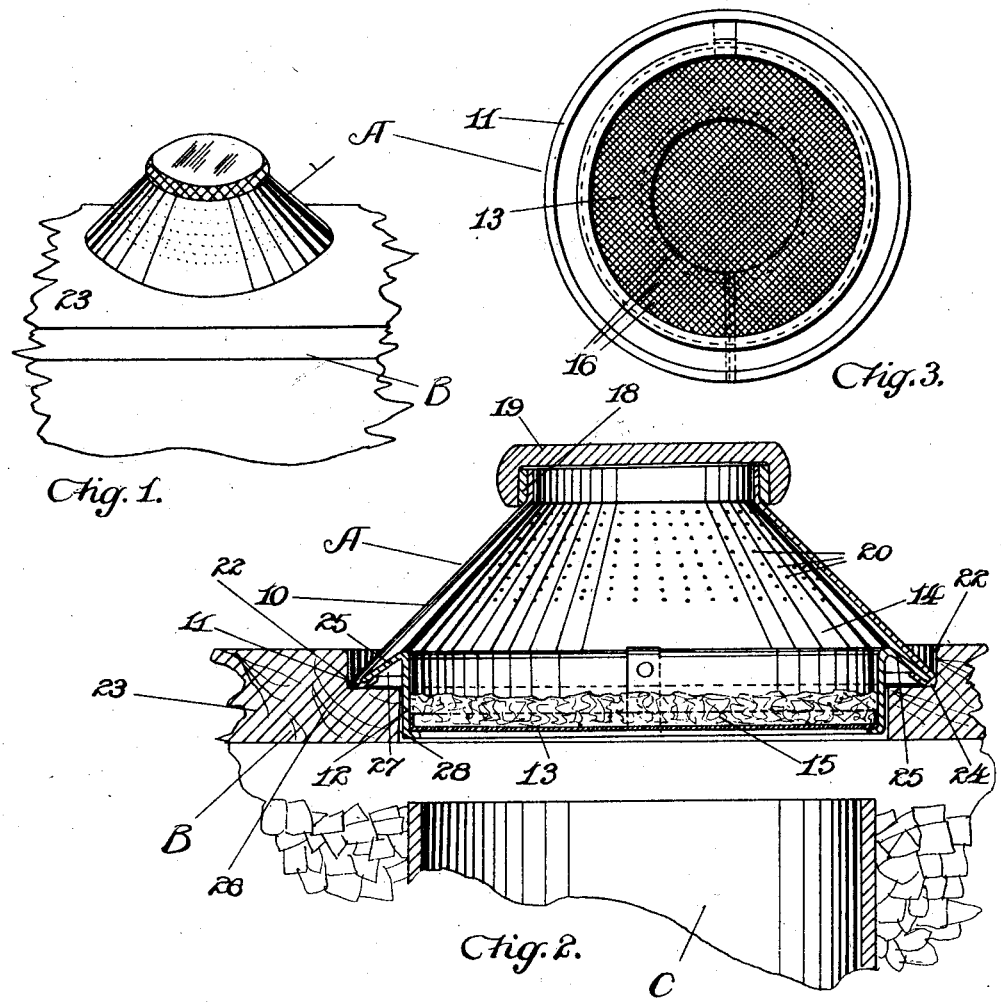
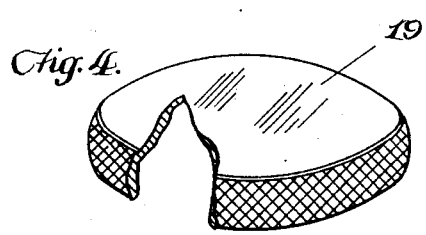
Inventor
Louis G. Ratterman
By
Attorney Patented Apr. 16, 1929.

1,709,486

UNITED STATES PATENT OFFICE.

LOUIS G. RATTERMAN, OF ST. PAUL, MINNESOTA.

COVER FOR REFRIGERATING CABINETS.

Application filed November 25, 1927. Serial No. 235,616.

My invention relates to covers for refrigerator cabinets and the primary object of which is to provide a means of overcoming the frosting and sweating of ice cream cabinets by providing a cover of a nature to permit ventilation and to absorb superfluous moisture in the atmosphere adjacent the opening of the ice cream cabinet. Heretofore considerable difficulty has been experienced in handling ice cream in refrigerator cabinets, due to the accumulation of frost and the condensing of moisture about the opening of the cabinet and top of the ice cream can. This is very undesirable in properly handling and dishing out of ice cream stored and maintained in this manner. My cover is designed to eliminate these undesirable features in a practical and economical manner.

My invention includes a cover made in a manner to form a hollow receptacle or being provided with a chamber therein which is adapted to contain a moisture absorbing substance. The substance to be contained within the cover is of such a nature as to be capable of absorbing many times its own volume of moisture and also permitting a limited circulation through the cover. The cover is of such a construction as to have a screened or perforated bottom portion and top portion having perforations therein, while a cap is provided at the upper portion of the cover which permits the moisture absorbing substance to be renewed from time to time as may be desired.

My cover may be formed of any suitable material permitting the same to be hollowed out to provide a chamber for moisture absorbing material. When formed of sheet material my cover provides a chamber having a comparatively flat bottom portion, an annular depending rim flange, a frustro-conical body portion with a suitable cap for closing the top of the same.

These features, together with other details and objects of my invention and the particular formation and arrangement of the parts will be more clearly and fully hereinafter set forth.

In the drawings forming part of my specification:

Figure 1 illustrates a perspective view of my cover in use on a refrigerator cabinet.

Figure 2 is a cross sectional view of the same, only a detail portion of the ice cream refrigerator cabinet being illustrated.

Figure 3 is a bottom view of my cover.

Figure 4 illustrates the cap of the cover removed and partially broken away.

My cover A is of a simple formation having frustro-conical body portion 10 from which depends an annular flange 11. The flange 11 connects with a cylindrical downwardly projecting portion 12 across which extends a straight bottom portion 13.

The cover A is formed of a hollow nature in a manner to provide an inner chamber 14 and the cylindrical portion 12 is adapted to provide a recess into which moisture absorbing material 15 may be placed extending across the bottom 13. The moisture absorbing substance 15 may be of any suitable nature, however, it is preferred that a substance having loose particles be used and also of a nature to absorb moisture many times the volume of the substance 15.

The major portion of the bottom 13 is of a formation either of fine mesh screen or very fine perforations such as 16. This permits the atmosphere which comes in contact with the bottom 13 to penetrate the openings 16 and contact with the moisture absorbing substance 15. The frustro-conical body portion 10 extends to the top rim 18 and a suitable cap 19 is adapted to fit over the cylindrical rim 18 either by screwing the same thereto or frictionally attaching the cap to the top. This cap A may be made of a composition material impervious to moisture or of a sheet material of any suitable nature. In fact, the whole cover may be made of a nonmetallic material which is of such a nature as to be impervious to moisture.

The upper portion of the frustro-conical body 10 is formed with a large number of perforations 20 which are sufficiently large to permit the circulation of air therethrough quite readily and thus any moisture absorbed into the substance 15 may be readily absorbed by the outer atmosphere, thereby providing a ventilating cover means A which is particularly adapted to ice cream refrigerator cabinets.

In use my cover A is adapted to fit into the rabbeted opening 22 of the top 23 of the ice cream cabinet B. The flange 11 engages in the recess 24 of the opening 22 and has its inner surface 25 of the same extending upwardly from the outer sharp edge 26 of the flange 11. This provides a peculiar formation to the flange 11 which causes the flange to fit tightly within the rabbeted opening 22 and forms an annular dead air space 27 about the upper part of the cylindrical portion 12, the lower part of the cylindrical portion 12 fitting quite closely in the lower part 28 of the opening 22. The refrigerator cabinet B is of the type which is used at soda fountains and places of a similar nature where refreshments are served and ice cream cans C are maintained with ice packed about the same, or where electrical refrigeration is provided in the cabinet B about the ice cream cans C, only a portion of the ice cream can C being shown in the drawings.

The ice cream cans C are placed in the refrigerator cabinet B and usually these cabinets have several of the ice cream cans therein spaced quite closely together, and each can C is provided with a cover in the opening 22. These covers are ordinarily of wood or other similar material and for this wooden cover I substitute my cover A which is adapted to accomplish the results hereinbefore specified.

In using my cover in conjunction with the ice cream can C in the refrigerator cabinets B the superfluous moisture in the cabinet B is adapted to be taken up by the absorbing material 15. Owing to the fact that the condensing of moisture is inclined to collect about the opening 22 it will be apparent that by means of my cover A wherein a moisture absorbing means is provided therein and an indirect circulation is also provided from within the cabinet to the outer atmosphere, it will be readily apparent that I provide a means of overcoming an undersirable feature which has been quite apparent heretofore in cabinets of this nature. I have found that with my cover ice cream may be maintained within the can C in a much better condition, and the temperature may be more evenly maintained within the cabinet B, the objectionable collection of frost about the upper open end of the can C and the undue condensing of atmospheric moisture in the opening 22 may be virtually eliminated. It is objectionable to have this moisture run into the can C. It is also desirable that a proper ventilation may be provided from the refrigerator cabinet B to the outer atmosphere without interfering wth the proper refrigeration within the cabinet B. I have found that my cover accomplishes this result and seems to provide virtually an indirect circulation from the inner part of the cabinet B to the outer atmosphere.

In this manner I provide a very desirable cover such as A for refrigerator cabinets, ice boxes, and other suitable refrigerating means where it is desirable to have a cover which may be readily removed from the cabinet to give free access to the contents of the refrigerating cabinet. I have found my cover overcomes the objectionable condensing and sweating of the cabinets where the same is used and that the ice cream is maintained in a better condition than where a tight wooden cover is used as has been done heretofore.

In accordance with the patent statutes I have described the principles of operation of my refrigerator cover and while a peculiar formation and shape is illustrated, it is evident that reasonable changes may be made and other adaptations may be accomplished within the scope of the following claims without departing from the spirit of my invention.

I claim:

1. A refrigerator cover for ice cream cabinets adapted to close the opening directly above the ice cream cans including, a sealing flange, a depending portion adapted to receive a moisture absorbing substance, a perforated bottom portion to maintain the moisture absorbing substance within said cover, an upper portion having perforations therein, and a cap for closing the same.

2. A cover adapted to provide indirect ventilation to a refrigerating cabinet including, a compartment for receiving moisture absorbing material, a perforated inner surface upon which said moisture absorbing material is adapted to rest, and an upper body portion extending above the moisture absorbing material having openings to the outer atmosphere.

3. A cover for ice cream cabinets including, a cylindrical bottom portion, an outwardly flaring flange portion, a frustro-conical body portion above said cylindrical portion, a cap for the top of said cover adapted to close the same, a finely perforated inner portion, and perforations formed in said frustro-conical portion to provide ventilating openings to the top of said cover.

4. A cover for refrigerator cabinets including, a body portion, an inner chamber formed in said body portion, a cap for said body portion adapted to close said chamber, and openings in said cover to permit indirect ventilation through said cover when the moisture absorbing substance is maintained within the same to overcome condensation of moisture and frost about the opening of the refrigerator cabinet.

5. A refrigerator cabinet cover including, a body portion of a hollow nature, a finely perforated bottom portion, an upper portion having perforations therein, and an opening for receiving a moisture absorbing substance which is adapted to be maintained across the bottom thereof to provide an absorbent sealing means which will absorb the superfluous moisture within an ice cream cabinet and to permit evaporation of the moisture collected thereby through the openings in the top of said cover.

6. A refrigerator cover including, a conical formation of the body thereof, an inner chamber formed therein, a conical depending annular flange extending thereabout, a cylindrical portion extending below said flange, a finely perforated bottom portion, a coarsely perforated upper portion, and a cap for closing the top thereof to permit a moisture absorbing substance to be maintained until renewed in said chamber.

LOUIS G. RATTERMAN.